United States Patent [19]

Wilson

[11] 4,380,494
[45] Apr. 19, 1983

[54] VIBRATING SCREEN WITH SELF-SUPPORTING SCREEN CLOTH

[75] Inventor: Albert Wilson, Columbia, S.C.

[73] Assignee: Litton Systems, Inc., Columbia, S.C.

[21] Appl. No.: 254,545

[22] Filed: Apr. 15, 1981

Related U.S. Application Data

[63] Continuation of Ser. No. 139,804, Apr. 14, 1980, abandoned.

[51] Int. Cl.³ .............................................. B07B 1/48
[52] U.S. Cl. ................................... 209/319; 209/403; 209/405; 209/408; 209/412
[58] Field of Search ................ 209/405, 408, 401–403, 209/409, 412, 404, 319, 395, 399, 400; 101/128.1

[56] References Cited

U.S. PATENT DOCUMENTS

| | | | |
|---|---|---|---|
| 1,361,772 | 12/1920 | Ouellette | 209/403 X |
| 1,879,377 | 9/1932 | McNeely | 209/403 |
| 1,886,173 | 11/1932 | Flint | 209/403 |
| 2,088,313 | 7/1937 | Wettlaufer | 209/403 |
| 2,114,406 | 4/1938 | Simpson | 209/408 X |
| 2,181,605 | 11/1939 | Norvell | 209/408 |
| 2,190,993 | 2/1940 | Muir | 209/405 X |
| 2,321,675 | 6/1943 | Hauge | 209/405 X |
| 3,070,231 | 12/1962 | McCorkel et al. | 209/403 X |
| 3,640,386 | 2/1972 | Frangos | 209/405 X |
| 3,684,091 | 8/1972 | Wehner | 209/405 X |
| 3,718,963 | 3/1973 | Hawkins et al. | 209/403 X |

FOREIGN PATENT DOCUMENTS

| | | | |
|---|---|---|---|
| 538689 | 8/1941 | United Kingdom | 209/405 |
| 743902 | 1/1956 | United Kingdom | 209/403 |

*Primary Examiner*—Ralph J. Hill
*Attorney, Agent, or Firm*—Morris I. Pollack

[57] ABSTRACT

A plurality of truss-like supports are secured, as by welding, and in spaced relationship, to the underside of a screen cloth. The supported screen cloth is then removably secured in position in a vibrating frame to form therewith a vibrating screen. Each truss-like support includes a support rod formed of wire rod of predetermined diameter disposed with a major portion thereof spaced from and substantially parallel to the plane of the screen cloth, and with end portions thereof merging into the plane of the end pieces of selected wire rods forming the screen cloth and being welded thereto. A spacer wire, formed from wire rod of a diameter less than that of the support rod and to an approximate sinusoidal configuration, is disposed so that the upper tips, formed by the sine configuration, are welded to the bottom surface of the screen cloth and so that the lower such tips are welded to the upper surface of the support rod.

29 Claims, 7 Drawing Figures

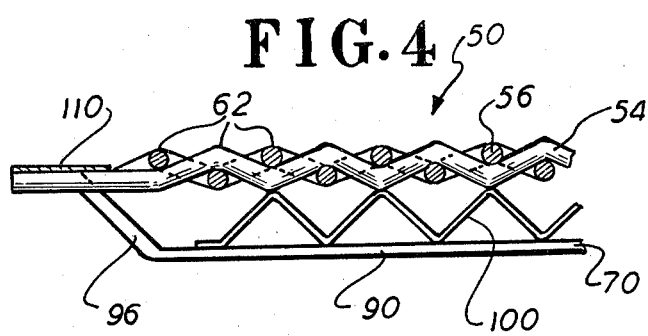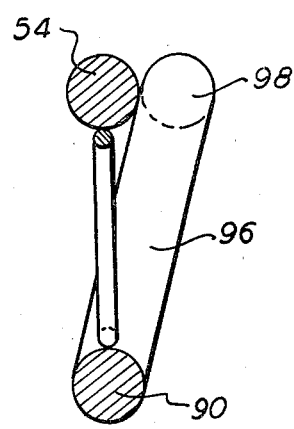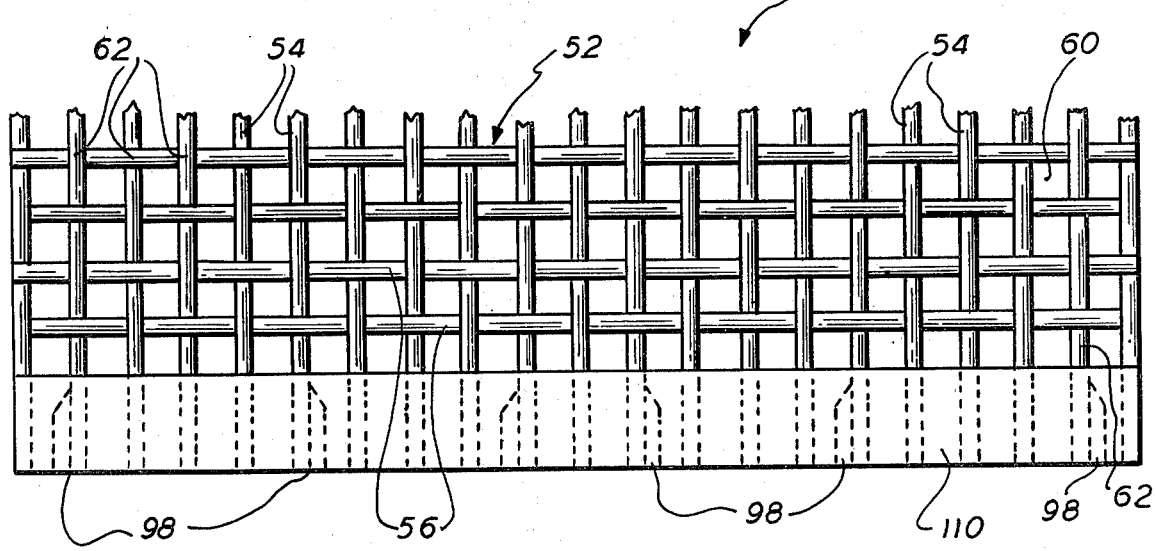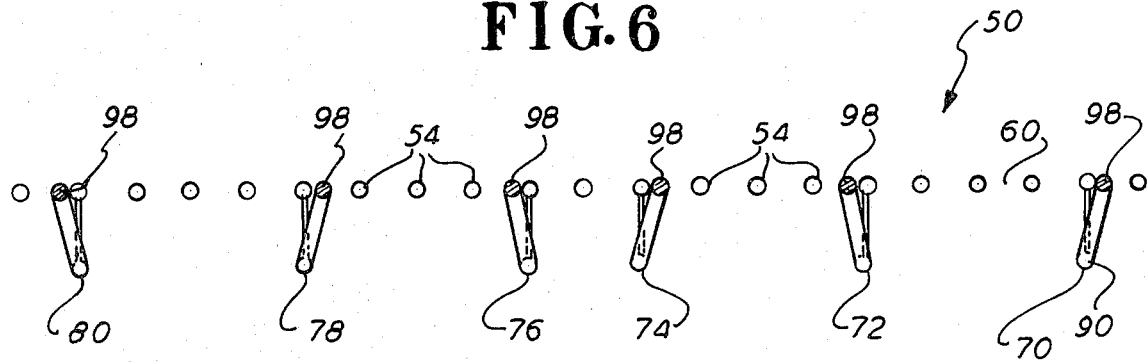

VIBRATING SCREEN WITH SELF-SUPPORTING SCREEN CLOTH

This is a continuation of application Ser. No. 139,804, filed Apr. 14, 1980, now abandoned.

BACKGROUND OF THE INVENTION-FIELD OF APPLICATION

This invention relates to bulk material processing equipment; and more particularly, to vibrating screens and screen cloth for vibrating screens.

BACKGROUND OF THE INVENTION-DESCRIPTION OF THE PRIOR ART

Vibrating screens find many uses in many diverse industries and applications. Their general purpose is to separate by size bulk material placed upon the screen wherein the constituent makeup of the bulk material includes elements which vary in size.

Where the constituent elements making up the bulk material, includes components like rock, aggregate or the like, that does not have sticky surface characteristics and therefore does not include lumps of pieces that are stuck together, the vibrating screen merely separates the components by size. The pieces too large to pass through the screen openings pass over the screen deck to be collected by suitable means. The pieces that are smaller than the openings pass therethrough and are either collected at the next lower level or are again separated by size by another level of screening.

However, some bulk materials, for one reason or another, may have to be processed even though its surfaces are sticky. The sticky surfaces may be natural to the bulk material or it may result from a particular process undergone by the material. No matter what, it may be desirable to utilize the screening function to break up the lumps of stuck together material into their individual pieces in addition to separating such pieces by size. If the pieces when so separated are essentially of uniform size then the screening function is merely to break up the lumps.

Some available vibrating screens utilize perforated plates for the screen deck or screening element. However, these have been found generally unsatisfactory because the interaction between the relatively smooth surfaced deck and the stuck together lumps does not provide as effective a separation of the lumps as is required and/or desired in many applications.

Other vibrating screens utilize screen cloth because the nodules or peaks, formed by the intersecting wire rods, present an irregular surface to the lumps of stuck together material and help abrade and separate same. However, in many applications the lack of rigidity of the installed screen cloth has proved to be detrimental to screen cloth life and has resulted in excessive down time.

Crowning of the screen cloth to impart some degree of rigidity to the installed deck while improving that aspect of the installation usually results in a migration of the screened material to the sides of the screen. This hinders collection of the screened material and often results in a disproportionate wear of the side plate and left and right side screen frame components.

Other attempts to providing a more rigidly installed screen deck involve fabricating the screen frame itself so as to be in contact with and to support the wire cloth with the cloth welded to such screen frame. In equipment so constructed when the screen cloth wears out, as it will eventually do, the separation of the welded joints is often so time consuming or impossible that a new screen frame, and possibly a new screen may be the less expensive alternative.

SUMMARY OF THE INVENTION

It is therefore an object of this invention to provide a new and improved screen cloth.

It is a further object of this invention to provide a new and improved screen cloth for a vibrating screen.

It is still another object of this invention to provide a new and improved vibrating screen.

It is yet another object of this invention to provide a new and improved self-supporting screen cloth.

It is yet still another object of this invention to provide a new and improved vibrating screen incorporating a self-supporting screen cloth deck.

This invention involves vibrating screens and screen cloth decks therefore; and contemplates forming the screen cloth deck so as to be self-supporting in a generally and substantially horizontally disposed planar configuration when installed in the vibrating frame of the vibrating screen.

Other objects, features, and advantages of the invention in its details of construction and arrangement of parts will be seen from the above, from the following description of the preferred embodiment when considered with the drawings and from the appended claims.

BRIEF DESCRIPTION OF THE DRAWING

In the drawing:

FIG. 4 is a vertical section of the left side of the screen cloth of FIGS. 2 and 3 showing same uninstalled;

FIG. 5 is a top plan view of an end section of the uninstalled screen cloth;

FIG. 6 is a vertical end view of the installed screen cloth of FIGS. 4 and 5; and FIG. 7 is an enlarged sectional view of one wire rod of the screen cloth of FIGS. 4-6 showing details of it's support assembly.

DESCRIPTION OF THE PREFERRED EMBODIMENT

Figures 1, 2, 3:
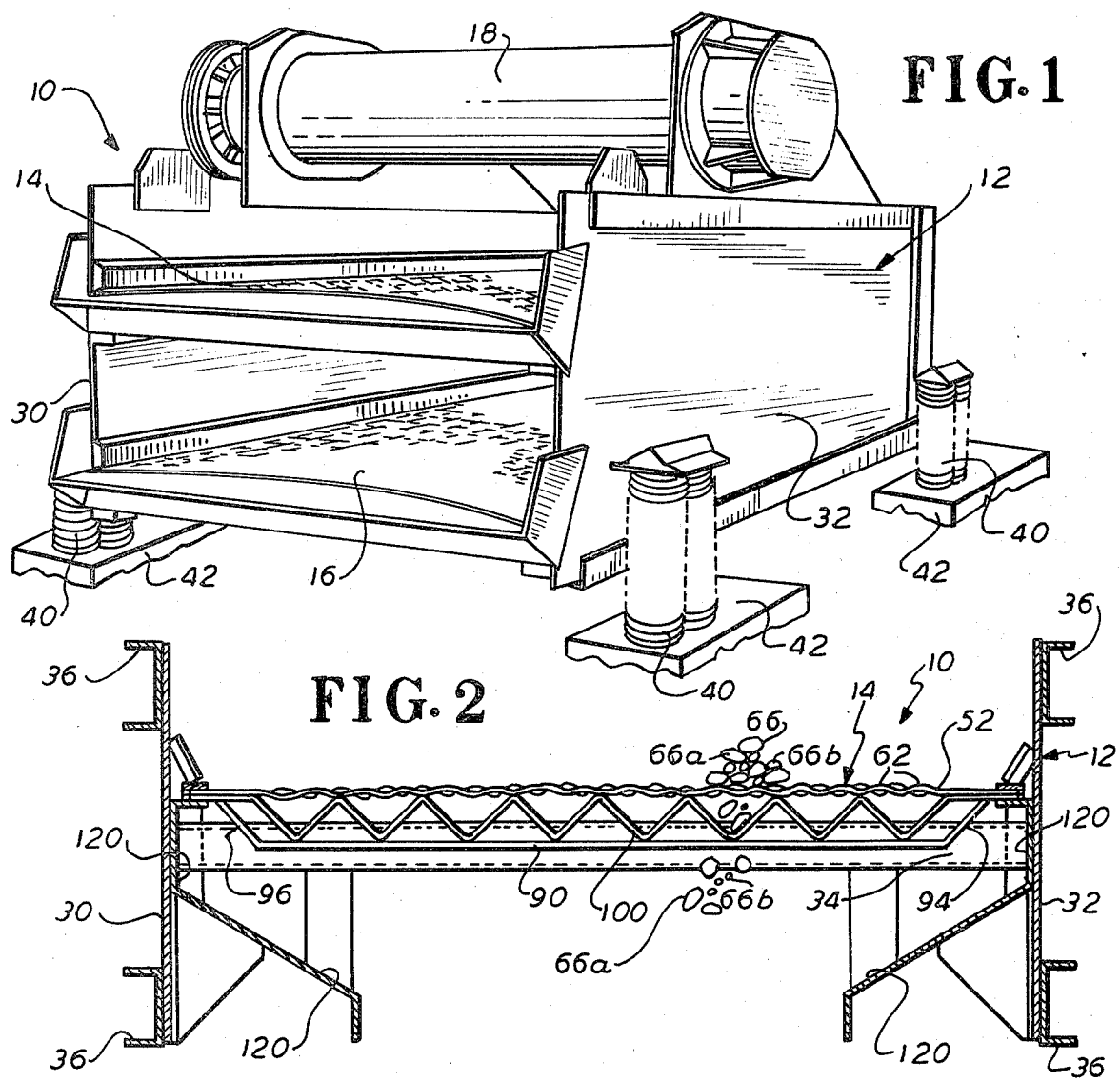
FIG. 1 is a perspective view of a vibrating screen incorporating the instant invention.
FIG. 2 is a section across the width of the vibrating screen of FIG. 1 showing a self-supporting screen cloth deck incorporating the instant invention installed therewithin.
FIG. 3 is an enlarged vertical section of the left side of the installed screen cloth of FIG. 2.

For convenience the invention will be described as applied to a vibrating screen having a pair of horizontally disposed spaced screen decks each including a single screen panel and all of which being supported by a vibrating frame that is springmounted on cement pads, and wherein the vibrating mechanism is mounted across the width of the screen and over the top of the upper screen deck; it should be understood, nevertheless, that without departing from the scope of this invention that the vibrating screen can have only one deck or more than two decks, that each deck can include any desired and appropriate number of screen panels, that the frame need not be horizontally disposed or spring mounted on cement pads as long as other suitable mounting means are provided, and that the vibrating mechanism can be positioned other than across and over the top screen deck as long as it is disposed to vibrate the frame and screen decks in an appropriate manner.

With reference to FIGS. 1 and 2, there is generally shown at 10 a vibrating screen including a spring mounted vibrating frame assembly 12, a pair of spaced screen deck assemblies 14, 16 (FIG. 1), and a vibrator or vibrating mechanism assembly 18 supported on and spanning vibrating frame assembly 12.

Vibrating or live frame assembly 12 includes a pair of spaced side plates 30, 32 spanned by and freely secured together by a plurality of support frame members 34 (only one shown in FIG. 2). Channel members 36, and other appropriately fabricated and suitably positioned members complete vibrating frame assembly 12 in substantially conventional manner.

A plurality of spring assemblies 40 facilitate the mounting of vibrating screen 12 on cement pads 42; it being understood that other suitable means such as pedestals (not shown) may be used for this purpose.

The vibrator or vibrating mechanism 18 is of conventional construction and is conventionally mounted across the top of and between side plates 30, 32. When connected to a suitable means of motive power and through suitable controls, vibrator 18 will impart a vibration to vibrating frame assembly 12 of predetermined characteristics to vibrate frame assembly 12, screen decks 14, 16, and any material disposed thereupon.

Screen decks 14, 16 each include a signal screen panel assembly 50 (FIGS. 2-6) sized to span the space between sideplates 30, 32 and to extend the length of vibrating screen 10. Each deck 14, 16, may however, just as easily consist of a plurality of screen panels sized to span the space between sideplates 30, 32 but each being shorter than the length of screen 12; the number of such panels being selected to provide a screen deck of appropriate length. In either instance the construction of each screen panel assembly 50 will be substantially identical.

Each screen panel assembly 50 includes a screen cloth section 52 fabricated in substantially conventional manner from a plurality of wire rods 54, 56 of predetermined size and cross-sectional configuration. Rods 54 extend in a side to side direction (across the width of screen 10) and are spaced from each other and are secured as by welding to rods 56 which extend front to back (in the direction of material flow) and are also spaced from each other. The spacing between rods 54, 56 is determined by the size of the desired screening openings 60. The weaving process for screen cloth 50 creates bumps or nodules 62 which coact with lumps of material 66 (FIG. 2) when disposed upon vibrating screen deck 14 to abrade same and facilitate separation of such lumps 66 into its individual particles 66a, 66b, etc..

A plurality of truss-like screen cloth support assemblies 70 (FIGS. 2, 4 and 6), 72 (FIG. 6), 74, 76, 78, 80 are secured (as by welding) to the underside of screen cloth section 52 to impart rigidly thereto and render same self-supporting. Each assembly 70-80 includes a support rod 90 (FIGS. 2, 4, 6 and 7) of predetermined diameter extending the width of screen cloth section 52. A major portion 92 (FIG. 2) of rod 90 is formed so as to be spaced from the underside of screen cloth section 52. End portions 94 (FIG. 2) and 96 (FIGS. 2-2, and 7) of rod 90 are formed to bend up towards and into the plane of screen cloth section 52. The extreme ends 98 of each support rod 90 are bent so as to lie in the plane of the ends of wire rods 54 of screen cloth section 52; and are each disposed adjacent selected ones of such rod ends (see FIGS. 5-7) and are secured thereto as by welding.

A support wire 100 (FIGS. 2-4) is formed into a substantially sinusoidal configuration with the upper tips 102 (FIG. 3) thereof spaced from the lower tips 104 so as to fill the space between the lower surface of screen cloth section 52 and an upper surface 106 of support rod 90. Support wire 100 is secured in position by welding, or otherwise, suitably attaching, tips 102 to the wires of screen cloth section 52, and tips 104 to surface 106 of rod 90.

An end piece 110 (FIGS. 3, 4 and 6) secured atop and to each side of screen cloth section 52, to facilitate it's installation into frame assembly 12, completes screen panel assembly 50.

A ledge 120 (FIGS. 2 and 3) is secured to the inside wall of each side plate 30, 32 so as to run the length thereof and to receive the ends of each screen panel assembly 50. Once a screen panel assembly 50 is disposed atop ledge 120 it is secured in position by one or more clamp block assemblies 122 (FIG. 3) of substantially conventional configuration and operation. If desired a wear plate 122 may be disposed as shown in FIG. 3 to protect the elements of clamp block assembly 122 from the accumulating and possibly abrasive effects of the material to be screened.

Each screen panel assembly 50 is thus of rigid construction with its screen cloth section 52 substantially self-supported, due to truss-like assemblies 70-80, and so supported in substantially a horiztonal plane. Installation and removal of such screen panel assembly or assemblies 50 in vibrating frame assembly 12 is easily accomplished as described hereinabove. When so installed material desposited in Jumps 66 on top of screen deck 14 will be vibrated, due to the coaction of vibrator 18, vibrating frame 12 and deck 14, and will coact with screen cloth 52 and its nodules 62 to be separated and sifted into its component particles 66a, 66b etc.. If desired screen 10 can include material flow shelves 120, appropriately secured to side plates 30, 32 to direct the flow of the sifted and sorted material.

From the above description it will thus be seen that there has been provided a novel and improved apparatus for sorting and sifting bulk material; which apparatus incorporates a substantially self-supported screen cloth disposed between the side plates of a vibrating frame to form therewith a vibrating screen with screen cloth decks supported in a rigid and substantially horiztonal disposition.

It is understood that although I have shown the preferred form of my invention that various modifications may be made in the details thereof without departing from the spirit as comprehended by the following claims:

I claim:

1. A screen panel for use in a vibrating screen; comprising:
    (a) screen cloth means formed from a plurality of rod-like members woven together to form a screen with openings of predetermined size and configuration; and
    (b) truss-like support means arranged beneath and secured to the underside of said screen cloth means;
    (c) said truss-like support means including at least one truss-like support assembly disposed beneath and secured to said under surface of said screen cloth means; said truss-like support assembly; comprising:
   (i) a support rod having a major portion thereof spaced from said under surface of said screen cloth means, and further having ends directed towards said screen cloth means, so that extremities of said ends lie in a common plane with and proximate to ends of said rod-like members forming said screen cloth means;
   (ii) means securing said extremities of said ends of said support rod to said ends of said rod-like members;
   (iii) support wire means formed into a substantially sinusoidal configuration with tips thereof spaced to fill the space between said under surface of said screen cloth means and a predetermined surface of said support rod; and
   (iv) means securing said support wire means in said space between said screen cloth means and said support rod.

2. The screen panel of claim 1, wherein said support means includes a plurality of said truss-like support assemblies spaced from each other beneath said screen cloth means.

3. The screen panel of claim 1, wherein said truss-like support assembly is disposed to lie across the width of said screen cloth means.

4. The screen panel of claim 1, wherein said means for securing said support rod and said support wire means in position is welding.

5. A vibrating screen, comprising:
   (a) live frame means;
   (b) screen deck means carried by said live frame means;
   (c) vibrator means carried by said live frame means and coacting therewith to vibrate same and said screen deck means in a predetermined manner; and
   (d) said screen deck means including wire cloth screening means and at least one support means therefore connected beneath and to said wire cloth screening means to support same in a rigid manner;
   (e) said support means including:
      (i) a support rod having a major portion thereof spaced from said under surface of said wire cloth screening means, and further having ends directed towards said wire cloth screening means so that extremities of said ends lie in common plane with and proximate to ends of said rod-like members forming said wire cloth screening means;
      (ii) means securing said extremities of said ends of said support rod to ends of rod-like members forming said wire cloth screening means;
      (iii) support wire means formed into a substantially sinusoidal configuration with tips thereof spaced to fill the space between said under surface of said wire cloth screening means;
      (iv) means securing said support wire means in said space between said wire cloth screening means and said support rod.

6. The vibrating screen of claim 5, wherein a plurality of support means are spaced from each other beneath said wire cloth screening means.

7. The vibrating screen of claim 5, wherein said support means is disposed to lie across the width of said wire cloth screening means.

8. The screen panel of claim 5, wherein said means for securing said support rod and said support wire means in position is welding.

9. A screen panel for use in a vibrating screen; comprising:
   (a) screen cloth means formed from a plurality of rod-like members woven together to form a screen with openings of predetermined size and configuration; and
   (b) truss-like support means arranged beneath and connected to the underside of said screen cloth means;
   (c) said truss-like support means including at least one truss-like support assembly disposed beneath and secured to said under surface of said screen cloth means, said truss-like support assembly, comprising:
      (i) a support rod having a major portion thereof spaced from said under surface of said screen cloth means, and further having ends directed towards said screen cloth means, so that extremities of said ends lie in common plane with and proximate to ends of said rod-like members forming said screen cloth means;
      (ii) means securing said extremities of said ends of said support rod to said ends of said rod-like members;
      (iii) support wire means formed into a substantially sinusoidal configuration with tips thereof spaced to fill the space between said under surface of said screen cloth means and a predetermined surface of said support rod; and
      (iv) means securing said support wire means in said space between said screen cloth means and said support rod.

10. The screen panel of claim 9, wherein said support means includes a plurality of said truss-like support assemblies spaced from each other beneath said screen cloth means.

11. The screen panel of claim 9, wherein said truss-like support assembly is disposed to lie across the width of said screen cloth means.

12. The screen panel of claim 9, wherein said means for securing said support rod and said support wire means in position is welding.

13. The screen panel of claim 9, wherein said support means supports said screen cloth means in a substantially horizontal condition.

14. A screen panel for use in a vibrating screen; comprising:
   (a) screen cloth means formed from a plurality of rod-like members woven together to form a screen with openings of predetermined size and configurations;
   (b) support means including at least one truss-like support assembly disposed beneath and secured to the under surface of said screen cloth means to support same in a substantially rigid condition separate from the frame of a vibrating screen;
   (c) said truss-like assembly; including:
      (i) a support rod having a major portion thereof spaced from said under surface of said screen cloth means, and further having ends directed towards said screen cloth means so that extremities of said ends lie in a common plane with and proximate to ends of said rod-like members forming said screen cloth;

(ii) means securing said extremities of said ends of said support rods to said ends of said rod-like members;

(iii) support wire means formed into a substantially sinusoidal configuration with tips thereof spaced to fill the space between said under surface of said screen cloth means and a predetermined surface of said support rod; and (iv) means securing said support wire means in said space between said screen cloth means and said support rod.

15. The screen panel of claim 14, wherein said support means includes a plurality of said truss-like support assemblies spaced from each other beneath said screen cloth means.

16. The screen panel of claim 14, wherein said truss-like support assembly is disposed to lie across the width of said screen cloth means.

17. The screen panel of claim 14, wherein said means for connecting said support rod and said support wire means in position is welding.

18. A screen panel for use in a vibrating screen; comprising:

(a) screen cloth means formed from a plurality of rod-like members woven together to form a screen with openings of predetermined size and configuration; and (b) truss-like support means arranged beneath and secured to the underside of said screen cloth means;

(c) said truss-like support means including at least one truss-like support assembly disposed beneath and secured to said under surface of said screen cloth means; said truss-like support assembly; comprising:

(i) support rod means having a major portion thereof spaced from said under surface of said screen cloth means, and further having ends terminating proximate said screen cloth means;

(ii) means securing said ends of said support rod means to said rod-like members of said screen cloth means;

(iii) support wire means arranged into a predetermined configuration with portions thereof extending across the space between said under surface of said screen cloth means and a predetermined surface of said support rod means; and (iv) means securing said support wire means in said space between said screen cloth means and said support rod means.

19. The screen panel of claim 18, wherein said truss-like support means includes a plurality of said truss-like support assemblies spaced from each other beneath said screen cloth means.

20. The screen panel of claim 19, wherein each of said truss-like support assemblies is disposed to lie across the width of said screen cloth means.

21. The screen panel of claim 20, wherein said means for securing said support rod means and said support wire means in position is welding.

22. The screen panel of claim 21, wherein said truss-like assembly is secured to said screen cloth means by welding.

23. A vibrating screen; comprising:

(a) live frame means;

(b) screen deck means carried by said live frame means;

(c) vibrator means carried by said live frame means and coacting therewith to vibrate same and said screen deck means in a predetermined manner; and (d) said screen deck means including wire cloth screening means and at least one truss-like support means therefore connected beneath and to said wire cloth screening means to support same in a rigid manner;

(e) said truss-like support means including:

(i) support rod means having a major portion thereof spaced from said under surface of said wire cloth screening means, and further having ends terminating proximate said wire cloth screening means;

(ii) means securing said ends of said support rod means to said rod-like members of said wire cloth screening means;

(iii) support wire means arranged into a predetermined configuration with selected portions thereof extending across the space between said under surface of said wire cloth screening means and a predetermined surface of said support rod means; and (iv) means securing said support wire means in said space between said wire cloth screening means and said support rod means.

24. The vibrating screen of claim 23, wherein said support means supports said screening means in a substantially horizontal condition.

25. The vibrating screen of claim 23, wherein a plurality of truss-like support means are spaced from each other beneath and secured to said wire cloth screening means.

26. The vibrating screen of claim 25, wherein said support means are disposed to lie across the width of said wire cloth screening means.

27. The screen panel of claim 26, wherein said means for securing said support rod means and said support wire means in position is welding.

28. The vibrating screen of claim 27, wherein said screen deck means includes a plurality of separate wire cloth screening means.

29. The vibrating screen of claim 28, wherein said screen deck means includes a plurality of screen decks each disposed at different levels in said live frame means.

* * * * *